(12) United States Patent
Tobergte et al.

(10) Patent No.: US 7,758,093 B2
(45) Date of Patent: Jul. 20, 2010

(54) MOTOR VEHICLE WITH A TAILGATE

(75) Inventors: Thomas Tobergte, Hagan A.t.w. (DE); Markus Grave, Lienen (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 35 days.

(21) Appl. No.: 11/962,345

(22) Filed: Dec. 21, 2007

(65) Prior Publication Data

US 2008/0185867 A1 Aug. 7, 2008

(30) Foreign Application Priority Data

Dec. 21, 2006 (DE) .................. 10 2006 061 835

(51) Int. Cl.
*B60J 7/20* (2006.01)
(52) U.S. Cl. ................ 296/56; 296/107.07; 296/107.17
(58) Field of Classification Search ............... 296/56, 296/146.2, 146.8, 76, 108, 107.07, 107.16, 296/107.17
See application file for complete search history.

(56) References Cited

U.S. PATENT DOCUMENTS

| | | | | |
|---|---|---|---|---|
| 5,921,611 | A * | 7/1999 | Townsend | 296/155 |
| 6,007,139 | A * | 12/1999 | Shave | 296/146.8 |
| 6,102,470 | A * | 8/2000 | Heim et al. | 296/187.11 |
| 6,371,549 | B2 * | 4/2002 | Kim | 296/146.8 |
| 6,454,341 | B2 * | 9/2002 | Tolinski | 296/106 |
| 6,497,448 | B1 * | 12/2002 | Curtis et al. | 296/146.8 |
| 6,505,882 | B1 * | 1/2003 | Morbach et al. | 296/146.11 |
| 6,634,699 | B2 * | 10/2003 | Collins et al. | 296/146.8 |
| 6,666,495 | B2 * | 12/2003 | Nania | 296/107.08 |
| 2002/0074821 | A1 * | 6/2002 | Pyo | 296/106 |
| 2005/0073167 | A1 * | 4/2005 | De Gaillard | 296/76 |
| 2005/0280280 | A1 * | 12/2005 | Heselhaus | 296/107.15 |
| 2006/0049660 | A1 * | 3/2006 | Schaller et al. | 296/103 |
| 2007/0273175 | A1 * | 11/2007 | Bunsmann et al. | 296/146.8 |
| 2009/0121516 | A1 * | 5/2009 | Ljungqvist et al. | 296/146.8 |

FOREIGN PATENT DOCUMENTS

| | | |
|---|---|---|
| DE | 19706418 | 8/1998 |
| DE | 20 2004 018 877 U1 | 3/2005 |
| DE | 102004003956 | 8/2005 |
| FR | 2876962 A1 * | 4/2006 |

OTHER PUBLICATIONS

Machine Translation of FR-2876962-A1, Apr. 4, 2010.*

* cited by examiner

*Primary Examiner*—Jason S Morrow
(74) *Attorney, Agent, or Firm*—Gifford, Krass, Sprinkle, Anderson & Citkowski, P.C.; Douglas L. Wathen (57) ABSTRACT

A convertible vehicle has a vehicle body with a passenger compartment, a convertible roof receiving space, and a baggage space defined therein. A convertible roof has a rear part with a rear window. The convertible roof has a closed position wherein it extends over the passenger compartment and an open position wherein the convertible roof is at least partially received in the roof receiving space. A tailgate at least partially covers the baggage space and has an open position and a closed position. The tailgate is movable to the open position to define a loading opening for baggage. The rear window is automatically pivoted upwardly to provide an additional loading opening for baggage when the roof is in the closed position and the tailgate is moved to the open position to provide the loading opening for baggage.

12 Claims, 14 Drawing Sheets

MOTOR VEHICLE WITH A TAILGATE

REFERENCE TO RELATED APPLICATION

This application claims priority from German application No. 10 2006061835.1, filed Dec. 21, 2006, the entire content of which is incorporated herein by reference.

FIELD OF THE INVENTION

The present invention relates to a motor vehicle having a tailgate for at least partially covering a baggage space and having a rear window arranged in the rear part of the roof.

BACKGROUND OF THE INVENTION

DE 20 2004 018 877 U1 illustrates a fixed roof vehicle with a rear window that can be pivoted open independently of the tailgate. The rear window is further pivotable with the upwardly hinged tailgate, which is pivotable about the same axis and into which said rear window is embedded. The rear window, however, abuts outwardly, which is undesired for a uniform visual effect. In addition, due to the common pivot axis of the tailgate and the rear window, the design options are limited.

SUMMARY OF THE INVENTION

The present invention provides a convertible vehicle with a vehicle body having a passenger compartment, a convertible roof receiving space, and a baggage space defined therein. A convertible roof has a rear part with a rear window. The convertible roof has a closed position wherein it extends over the passenger compartment and an open position wherein the convertible roof is at least partially received in the roof receiving space. A tailgate at least partially covers the baggage space and has an open position and a closed position. The tailgate is movable to the open position to define a loading opening for baggage. The rear window is automatically pivoted upwardly to provide an additional loading opening for baggage when the roof is in the closed position and the tailgate is moved to the open position to provide the loading opening for baggage.

The present invention provides an enlargement of the loading opening for baggage in a convertible vehicle. At the same time, it is not necessary to move the tailgate and the rear window separately. Because of the automatic pivoting of the rear window, it is only necessary to move the tailgate without having to concern oneself with the movement of the rear window. In a convertible vehicle, it is necessary for the roof, which supports the rear window, to separate from the body. As such, it is impossible for a tailgate to extend upwardly beyond the rear window. The present invention makes it possible to provide a loading opening which extends from the upper hinge arrangement of the rear window down to the lower edge of the tailgate, that is down to or into the bumper.

The tailgate has a dual function in that it at least partially covers both a receiving space for the opened roof and a baggage space, and it can be opened in the same direction both to provide a passage opening for the roof into or out of its receiving space and to provide a loading opening for baggage. The present invention allows a convertible vehicle to be made with a very short tail end, such as a hatchback. A vehicle in accordance with the invention can be a small automobile, a compact, SUV, van or station wagon.

The tailgate can be opened with the rear window remaining in the fixed position or the tailgate can be opened with an automatic opening of the rear window, thereby allowing a high degree of flexibility in operation. In order to open the roof of a convertible vehicle, the tailgate is opened to provide a passage opening for the roof into its receiving space and the rear window remains in the roof and can be stowed jointly therewith.

The present invention may also be used with a closed vehicle structure to be able to load or unload small pieces of baggage without any great lifting or to allow smaller pets fast access.

In some embodiments, the rear window can be pivoted open and is biased towards the open position. As such, a separate drive means is not required to open the window. When the tailgate is at least partially open, the tailgate overlaps the rear window and therefore blocks its movement. As such, a separate lock or a similar securing mechanism for the rear window can be dispensed with. When the tailgate is closed, the rear window can automatically be moved downwardly against the force of the drive means acting on it and can also be held in the closed position by the closed tailgate. These features can also be realized not only in a convertible, but also in a closed vehicle structure.

In preferred embodiments, rear window is biased towards the open position, with the opening movement being blocked by the closed tailgate. The tailgate holds the lower edge of the rear window tight in the closed position, for example by having a roller member or slide member associated with the lower edge of the window that is guided by the inner side of the tailgate.

With either direct or indirect guidance of the lower rear window edge by the tailgate, both the opening and closing of the rear window can be coupled in a compulsory manner to the movement of the tailgate. The automatic aspect of the rear window movement can then be operative on the opening and closing without a user having to spend any time thinking about it.

The tailgate can be pivoted upwardly to provide a loading opening for baggage and the rear window can be held in this position in its pivoted open position below the tailgate and partly covered by the tailgate. A particularly large loading opening, for instance from the bumper up to the hinge axis of the pivoted open rear window can thus be achieved in such a position. In addition, the rear window and the tailgate cooperate to provide a cover for rain protection when they are open.

The hinging of the tailgate can nevertheless be disposed below a window belt line, which extends below the side windows and substantially along the longitudinal direction of the vehicle. This line at the upper edge of the body defines a dividing line between the roof and the body.

The vehicle be made as a hatchback and the tailgate can include a substantially upright trunk trim panel part that defines the rear end of the receiving space. As such, a vehicle in accordance with the invention can also be made as a small automobile or as a compact.

The rear window can pivot open without a frame or be held in a pivot frame co-movable with it. In the latter case, with the roof and rear window closed, the lower termination of the pivot frame can be sealingly engaged behind by the upper edge of a closed tailgate. This pivot frame can then not be pivoted open when the tailgate is closed. The rear window can engage a seal of the pivot frame from the outside and the lower edge of the window can be a little above the lower edge of the pivot frame. With this design, window can be pivoted open separately with respect to the pivot frame when the tailgate is closed. A particularly flexible handling is thus made possible.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

A convertible vehicle 1 in accordance with the present invention can be a four-seater vehicle, a vehicle with multiple seats provided with at least one rear bench, or a two-seater. The hatchback design can be found frequently in the small and compact automobile sector and, for instance, with SUVs, station wagons or vans.

The movable roof 2 adjoins a windshield frame 3 indirectly or directly in the closed position. The illustrated roof 2 is a retractable hard top (RHT), having a plurality of generally plate-shaped assemblies that are mutually separated at their outer surface. Alternatively, the roof can be a soft top, with a flexible covering.

A rear window 5 is disposed in the retractable roof 2. With the roof 2 closed, the rear window can be pivoted open with respect to rear side columns 6 which laterally encompass the rear window and can be lowered when the retractable roof is opened.

The roof 2 can be moved downwardly when it is opened. A receiving space may be provided for the receiving the roof and the receiving space may be at least partly covered by a tailgate 7. The tailgate acts in a dual function for at least partially covering the roof receiving space and a baggage space. The baggage space can include the roof receiving space. In particular with a retractable hard top, the tailgate pivots open both to provide a passage opening for the roof 2 and to provide a loading opening for baggage. Both tailgate opening movements can nevertheless take place in the same way, namely such that the rear edge of the tailgate is raised upwardly and forwardly to provide both openings. In the simplest version, the tailgate pivots around a transverse axis that is fixed with respect to the vehicle. In the illustrated embodiment, a four-bar linkage is used so that the front edge of the tailgate 7, with the roof 2 closed, is transposed upwardly and also rearwardly when opened.

In the illustrated embodiment, the rear window 5 is disposed in a frame part 8 of the roof 2 that is open at the lower end. The frame part 8 and rear window 5 can be lowered when the roof is opened. The frame part 8 may be one part or multipart and be fixedly connected to the sections of the roof 2 disposed laterally of the rear window 5. The frame part 8 may be stowed with these lateral roof sections in the body when the roof is opened.

The frame part 8 extends along the upper edge and laterally around the rear window 5, when it is closed, and can therefore be substantially U-shaped and downwardly open.

The rear window 5 may pivot open as a frameless assembly with respect to this frame part 8, for example by means of gas-pressurized springs 9 active with respect to the frame part 8. In this version, the pivot hinges 10 may directly engage the rear window 5. Alternatively, the rear window 5 may be held in a pivot frame 11 co-movable with it, as is shown in FIGS. 2 to 6. Two different types of opening of the rear window 5 are possible with this design. The rear window can be pivoted open with the pivot frame 11 or it can be pivoted open individually with the frame 11 fixed so that the rear window 5 may be opened with the tailgate 7 closed (not shown).

The rear window 5 can nevertheless be pivoted open with respect to the pivot frame 11 when the tailgate is in this closed position. The tailgate 7 seals and holds the lower edge of the pivot frame 11, but the rear window 5 may still be opened since the lower edge of the rear window 5 ends a little above the lower edge of the pivot frame 11.

When the tailgate and rear window are pivoted open, a particularly large loading opening is provided, extending approximately from the bumper up to the upper roof surface. Nevertheless, it is not necessary for the tailgate itself to extend completely from the top to the bottom. Rather, the tailgate 7 extends downwardly only approximately from the horizontal window belt line 12 when the tailgate is in the closed position. When the rear window 5 and the tailgate 7 are pivoted open, the rear window 5 can be held in its pivoted open position beneath the tailgate 7 and partly covered thereby. The danger of injury to the head is reduced when the tailgate and rear window are in the fully opened position. In addition, because the tailgate 7 and the rear window 5 both cover the loading opening, they provide protection against weather during loading or unloading.

When the convertible roof is opened, the rear window may remain fixedly connected to the frame parts 8 in the manner of a conventional rear window.

The tailgate 7 can be opened manually or automatically, and the rear window 5 can be automatically pivoted upwardly to an open position with respect to the closed roof, since the movement of the rear window is coupled to the movement of the tailgate (e.g. FIG. 3 to FIG. 6).

The coupling of the rear window to the tailgate does not necessarily have to be operative on each opening of the tailgate 7. It may be possible to selectively allow the rear window 5 either to pivot upwardly to the open position automatically when the tailgate is opened to provide a loading opening for baggage or to leave the rear window in its closed position embedded in the roof 2, in particular when the tailgate 7 is opened to provide a passage opening for the roof 2. For this purpose, for example, two different opening buttons can be provided on the tailgate 7 or the dashboard with which the type of opening can be respectively distinguished.

Figure 1:
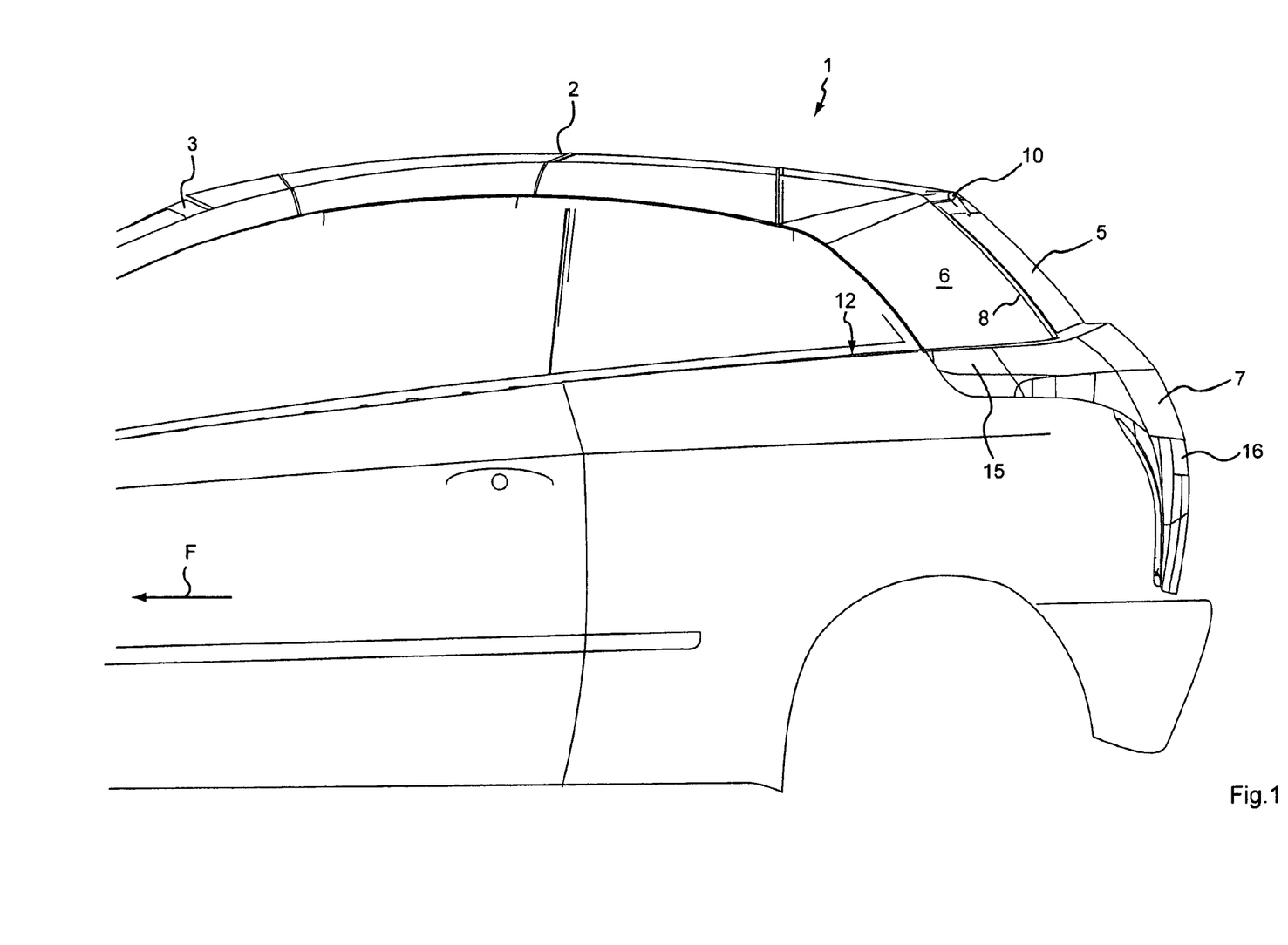
FIG. 1 is a schematic side view of a rear portion of a convertible vehicle in accordance with the present invention with the roof, tailgate, and rear window closed.
Figure 2:
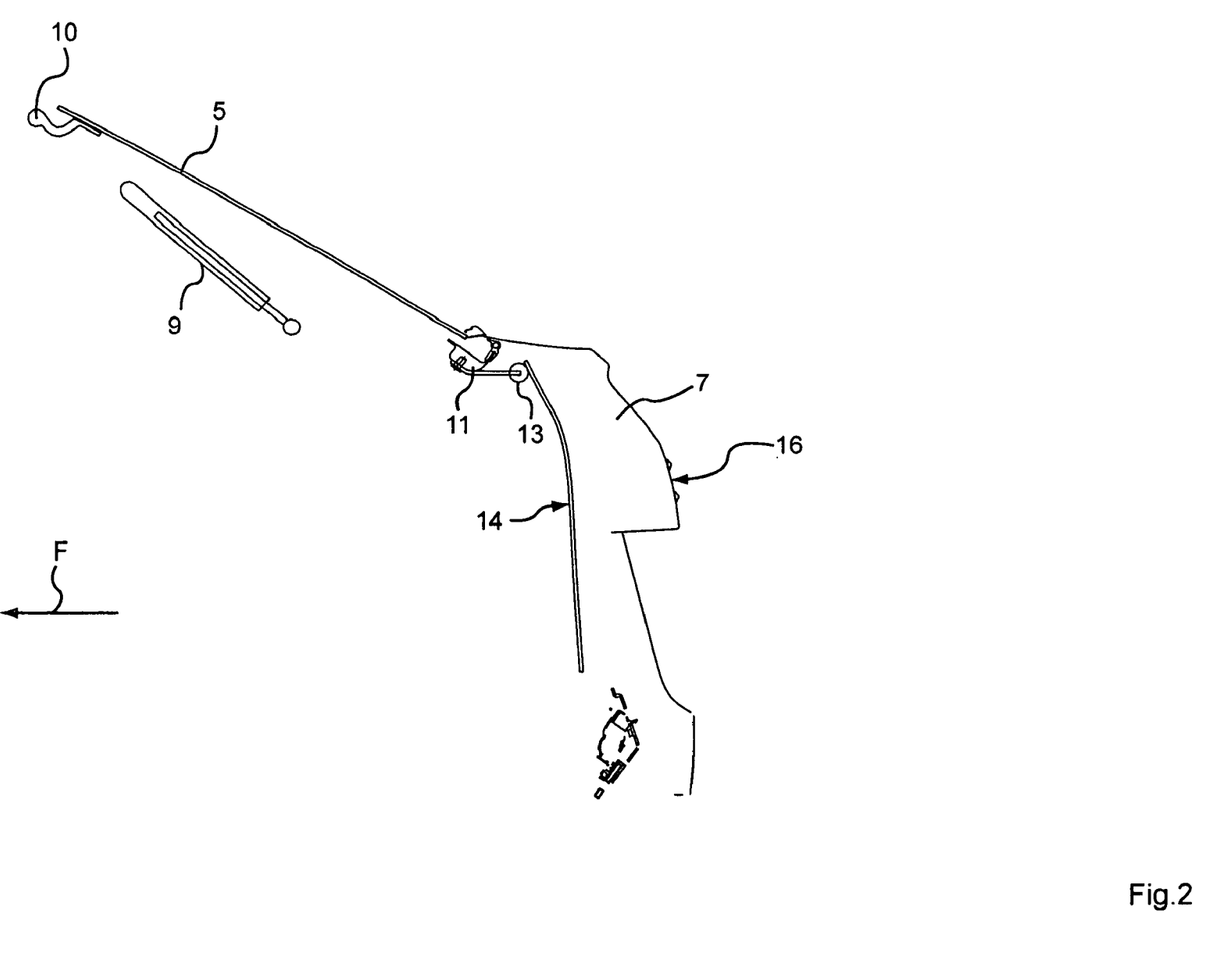
FIG. 2 is a longitudinal section of the tailgate and rear window region of the vehicle of FIG. 1, approximately in the transverse center of the vehicle.
Figure 3:
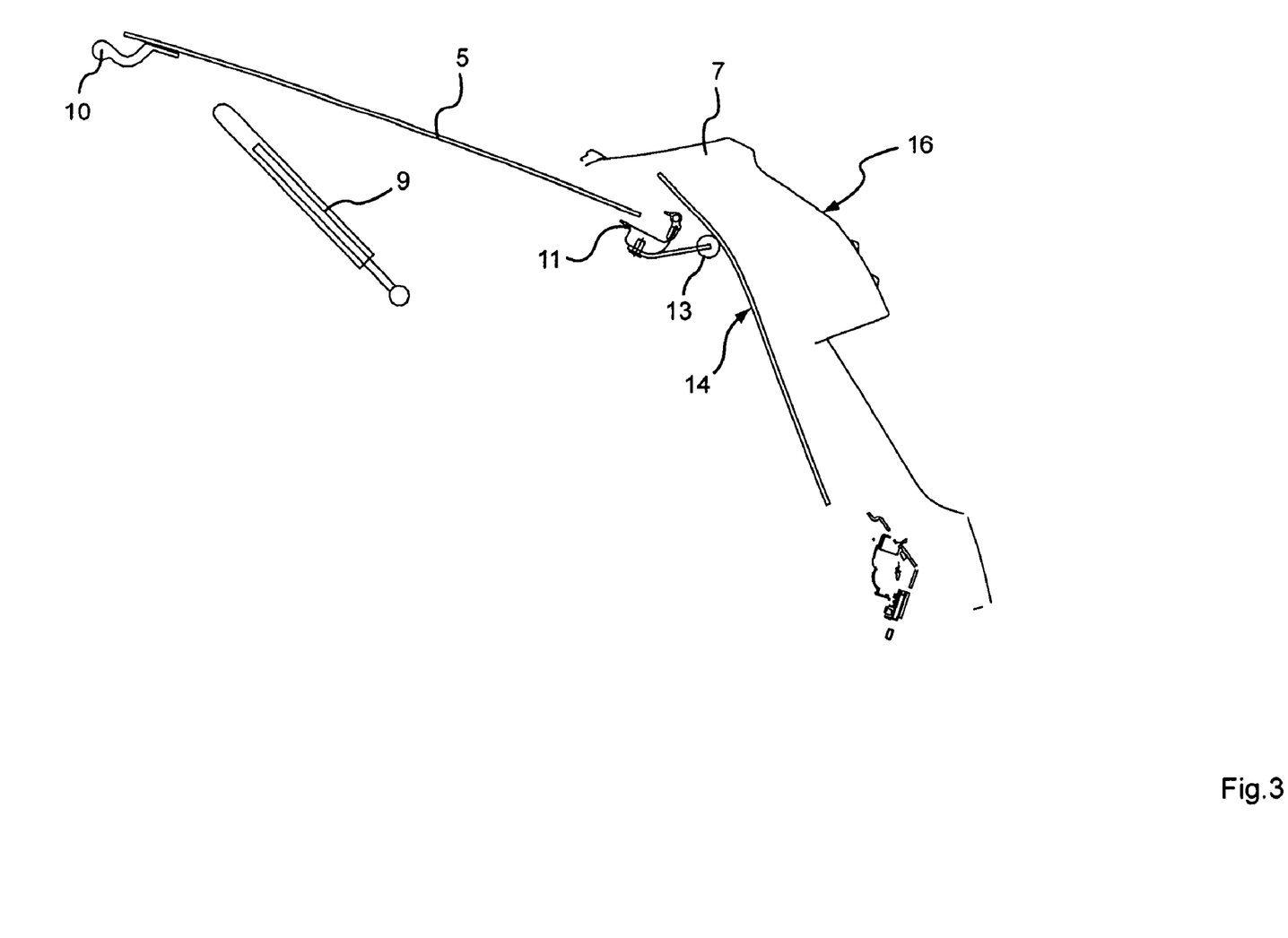
FIG. 3 is a similar view to FIG. 2 with the tailgate pivoted partially upwardly and the rear window moved therewith.
Figure 4:
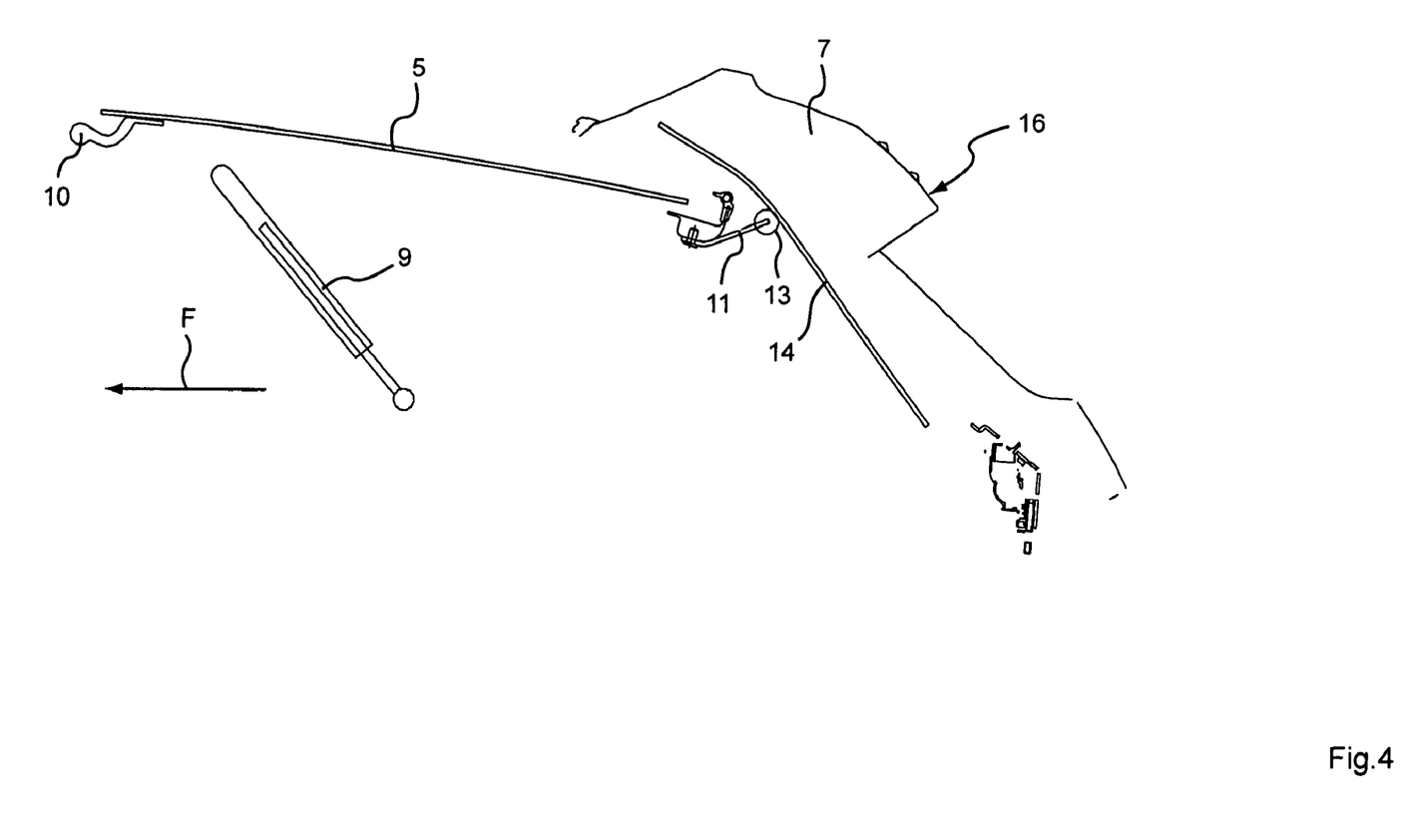
FIG. 4 is a similar view to FIG. 3 with the tailgate and rear window opened further.
Figure 5:
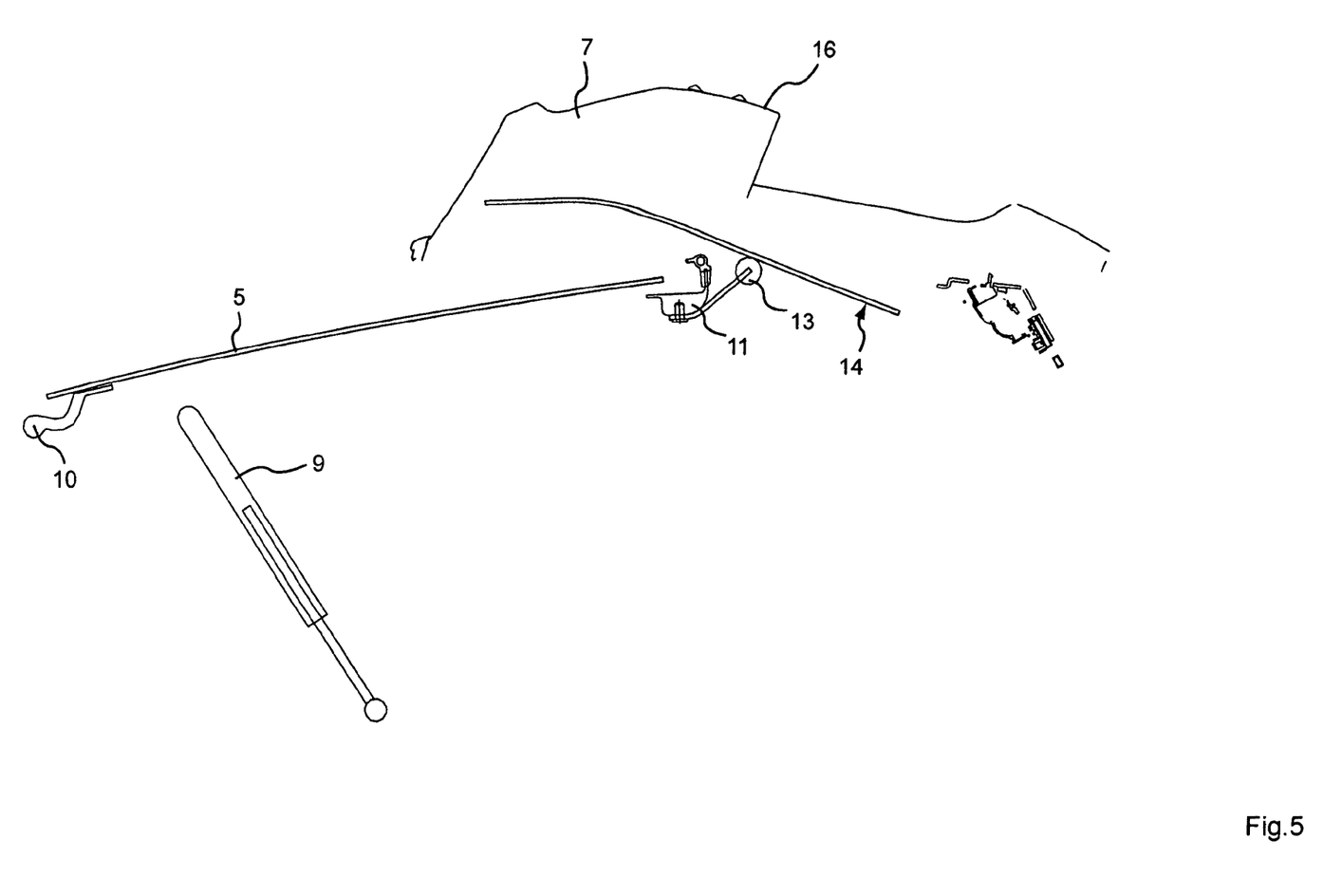
FIG. 5 is a similar view to FIG. 4 with the tailgate and rear window almost completely open.

In the first embodiment of the present invention, illustrated in FIGS. 1 to 6, the rear window 5 is biased towards the open position, for example, via gas-pressurized springs 9, telescopically extensible rails or other measures. This opening movement is, however, blocked by a section of the tailgate 7 which extends over the rear window when the tailgate is in its closed position (FIG. 2). This blocking may be accomplished by at least one roller body or slide body 13 associated with the lower edge of the rear window 5. In the illustrated embodiment, a roller is guided by the inner side of the tailgate and is pressed by the action of spring force against a guide track 14 arranged in the tailgate 7.

The hinging arrangement of the tailgate 7 is disposed below the window belt line 12, which extends under the side windows and substantially in the longitudinal direction of the vehicle. In the illustrated embodiment, the window belt line 12 extends over forwardly projecting side wings 15 of the tailgate 7. In a plan view, the tailgate 7 is thereby approximately U-shaped and only has a narrow transverse web in the region of the window belt line 12 in the middle region. The vehicle therefore does not need any notchback, but can be made as a hatchback vehicle, with the tailgate 7 including a substantially upright trunk trim panel part 16 terminating the receiving space to the rear.

When the tailgate 7 is opened, the guide track 14 pivots rearwardly and upwardly with the tailgate so that the roller body or slide body 13 has additional movement space. Consequently, the gas-pressurized spring 9 is able to push outward continuously (FIG. 2 to FIG. 6). In the open position of the tailgate 7 (FIG. 6), the rear window 5 is then pivoted open up to a position beyond horizontal by pivoting, for example, approximately 90° or more.

Figure 6:
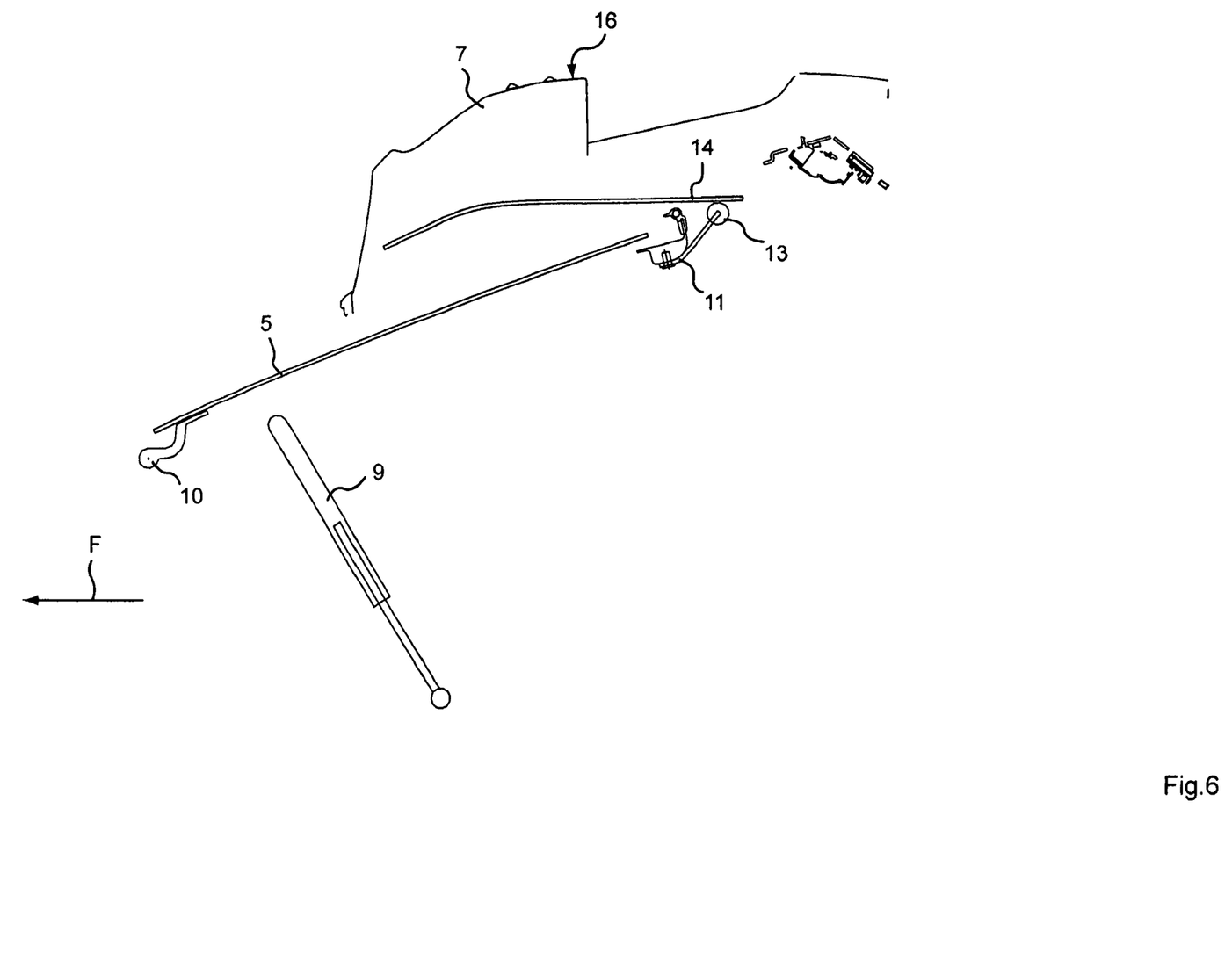
FIG. 6 is a similar view to FIG. 5 with the tailgate and rear window completely open, the rear window being partly overlapped by the tailgate in this position.

In this open position, the rear window 5 is held below the tailgate 7 and partially covered by it—with the aforesaid advantages. When the tailgate 7 is closed, the guide track pushes the roller body 13 against the force of the springs 9 and the rear window 5 is thus forced into its closed position.

Since the pressing of the rear window 5 against the guide track 14 in this embodiment is only effected via spring force, the window 5 can also be secured against this spring force, for instance by an additional lock for holding it in the closed position.

In the second embodiment of the present invention, shown in FIGS. 7 to 14, in contrast, the pivoting open and closed of the rear window 5 is coupled in a compulsory manner to the movement of the tailgate 7. A twin roller 17 associated with the rear window 7 can be moved within a closed guide track 18 in the tailgate 7.

Figure 7:
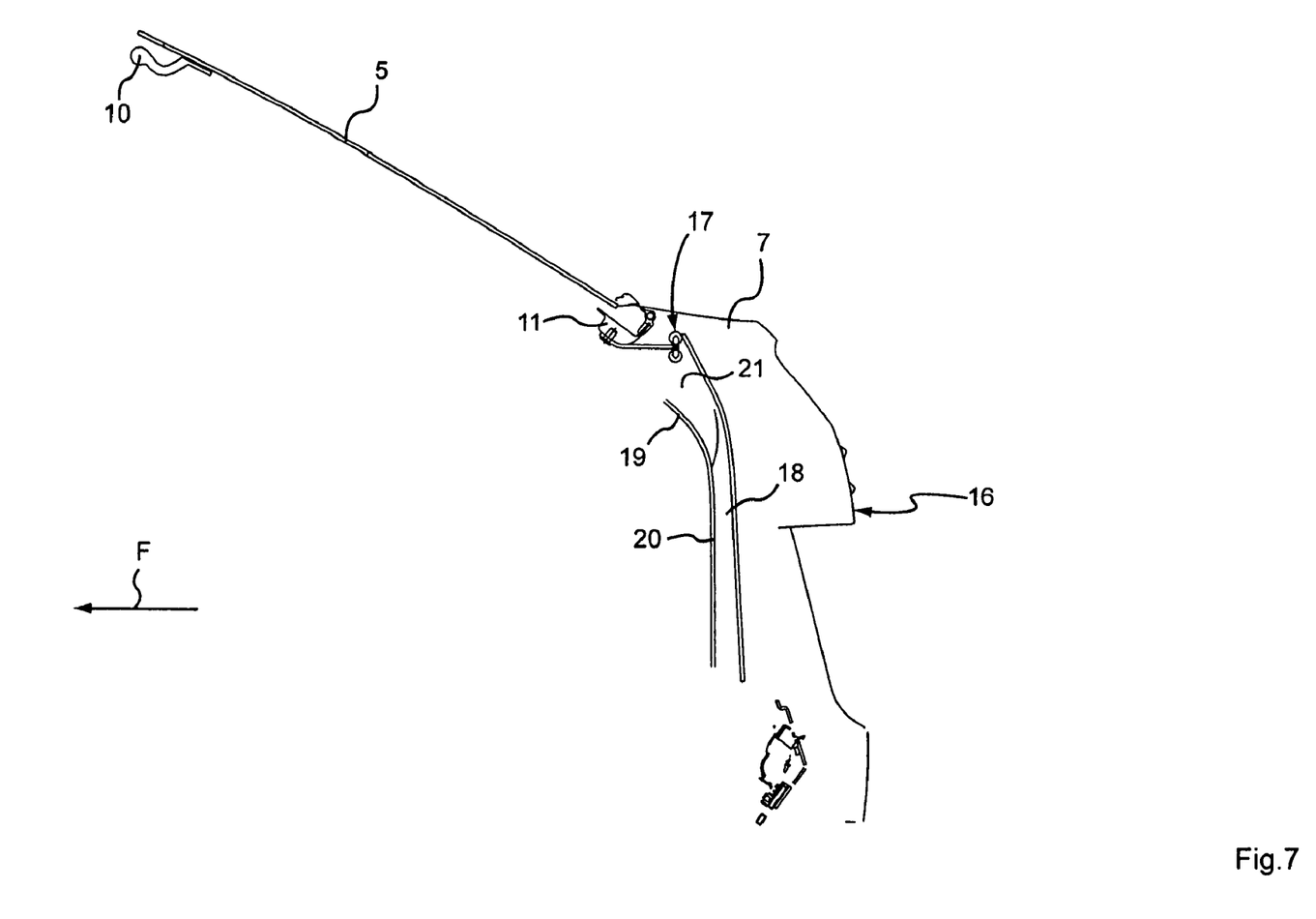
FIG. 7 is a similar view to FIG. 2 illustrating an alternative embodiment, wherein the lower end of said rear window is held in a guide rail during opening and closing.
Figure 8:
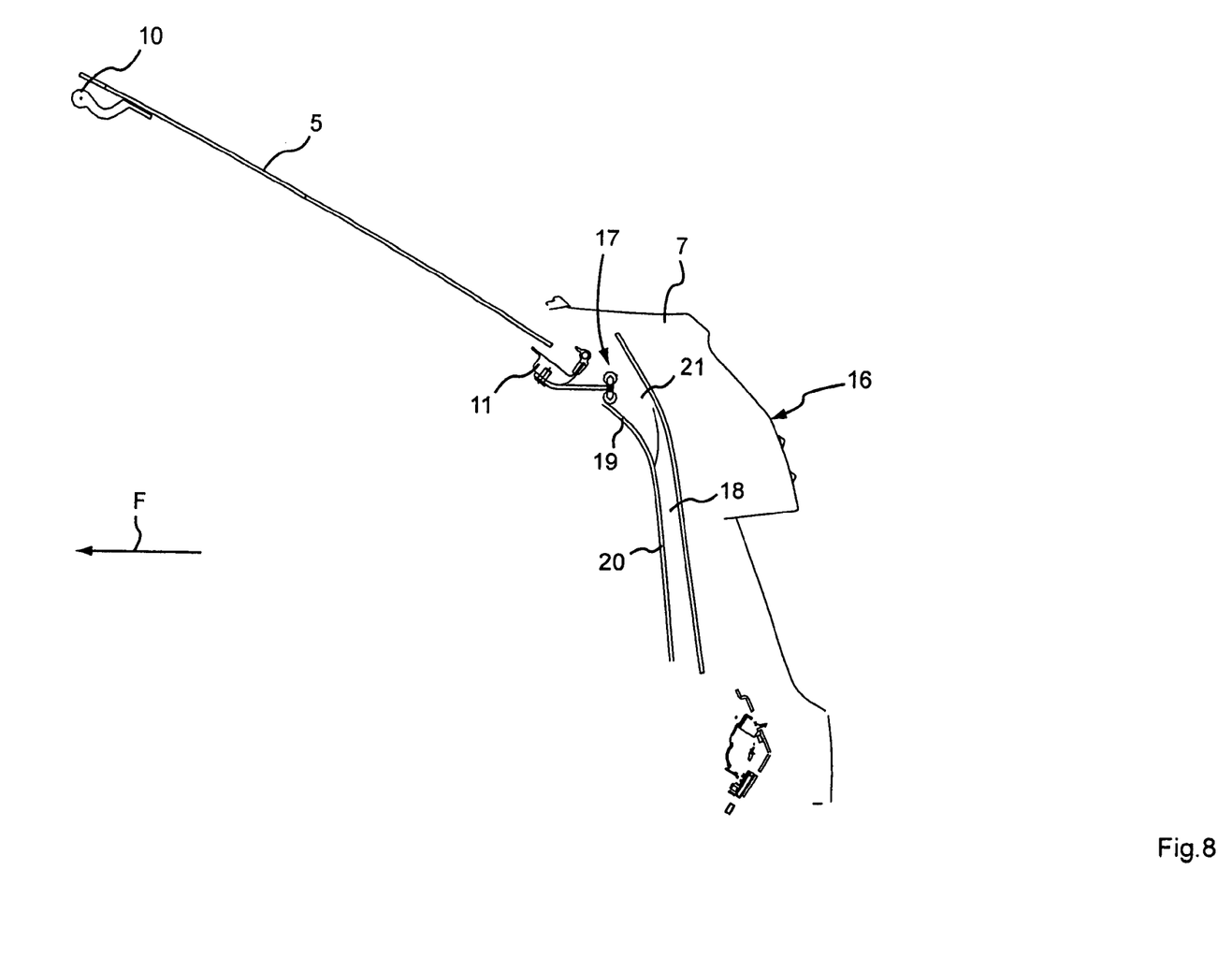
FIG. 8 is a similar view to FIG. 7 with the tailgate starting to open and a twin roller guide on the rear window engaging an inner guide rail.
Figure 9:
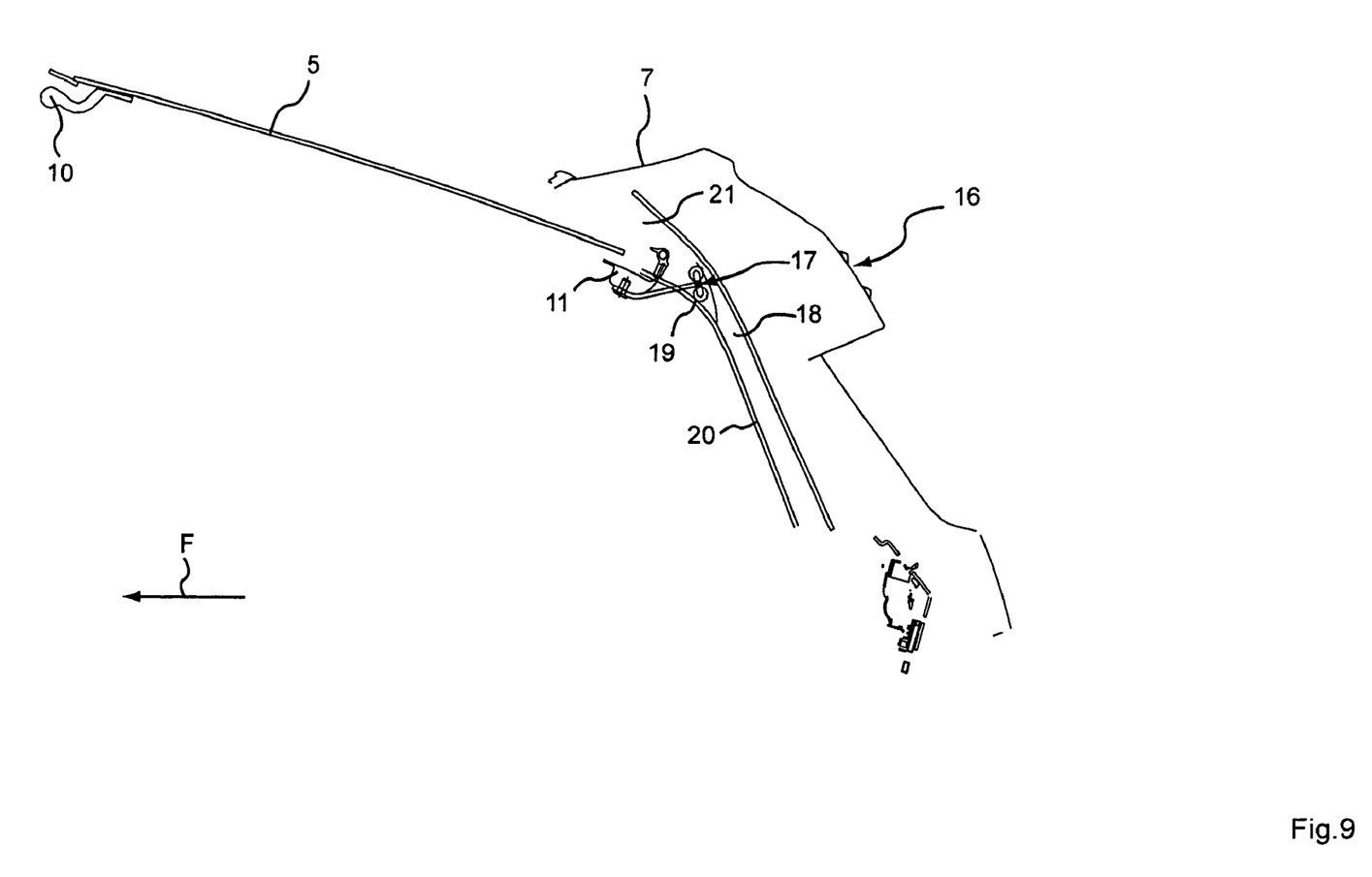
FIG. 9 is a similar view to FIG. 8 with the tailgate and rear window partially opened.
Figure 10:
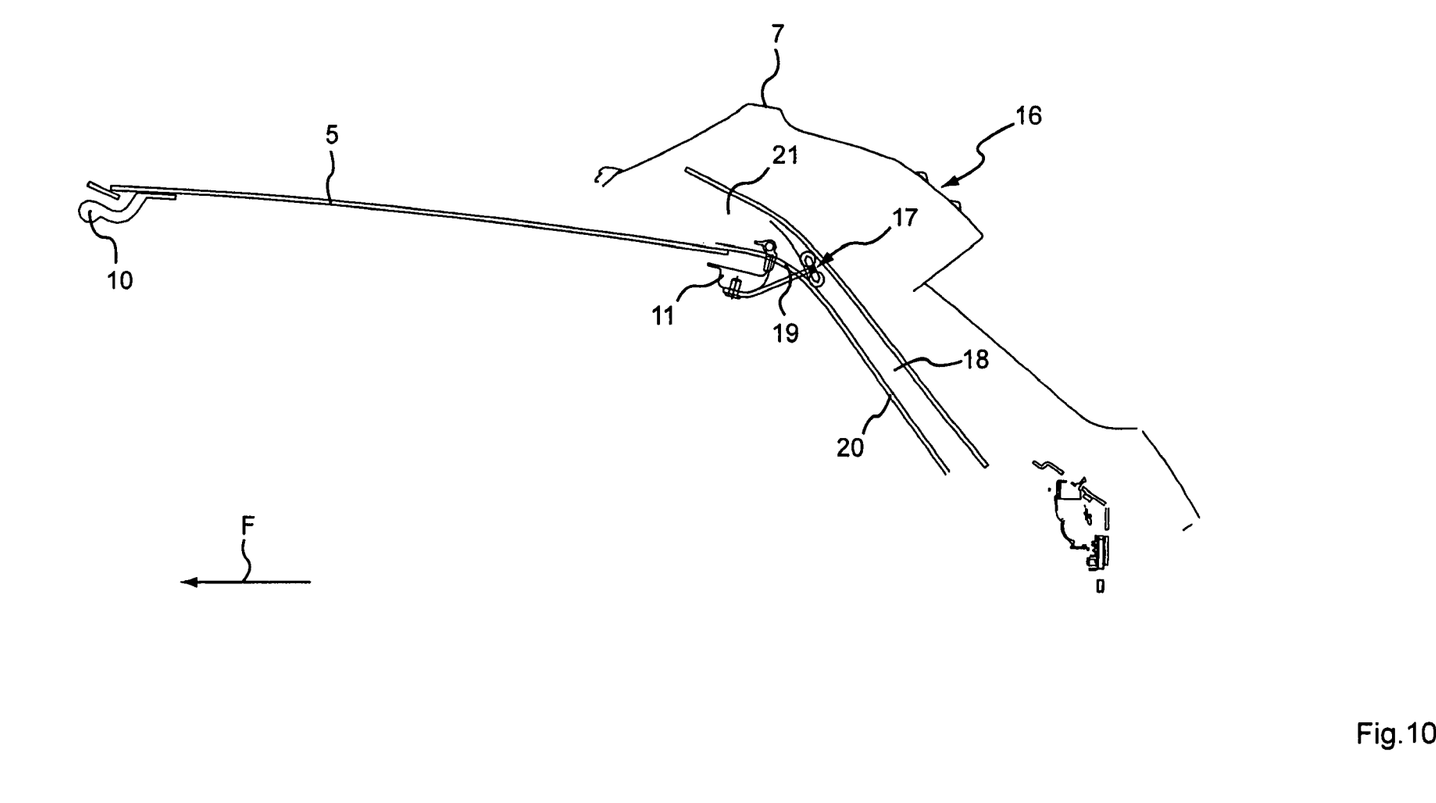
FIG. 10 is a similar view to FIG. 9 with the tailgate and rear window opened further.
Figure 11:
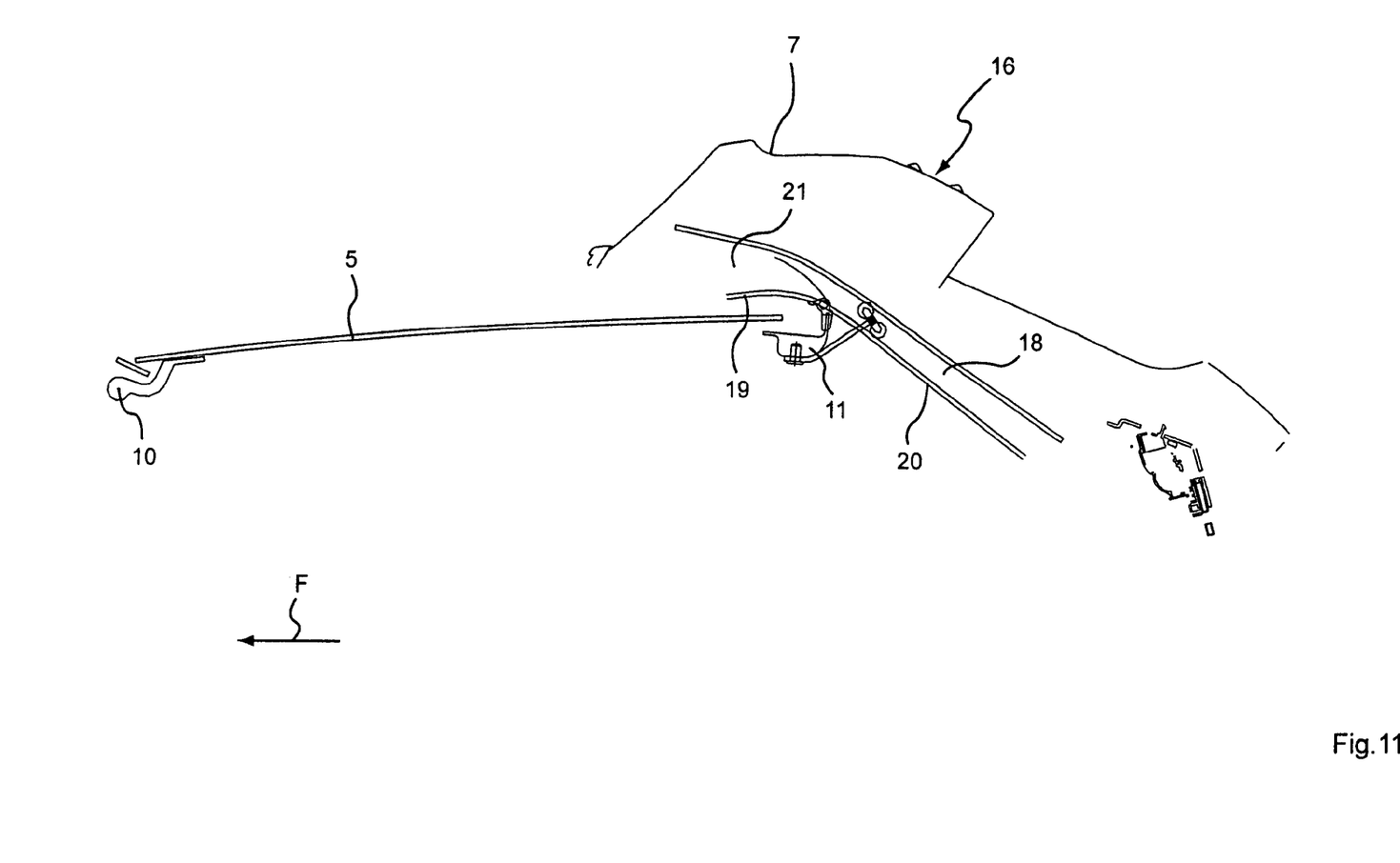
FIG. 11 is a similar view to FIG. 10 with the tailgate and rear window opened still further.
Figure 12:
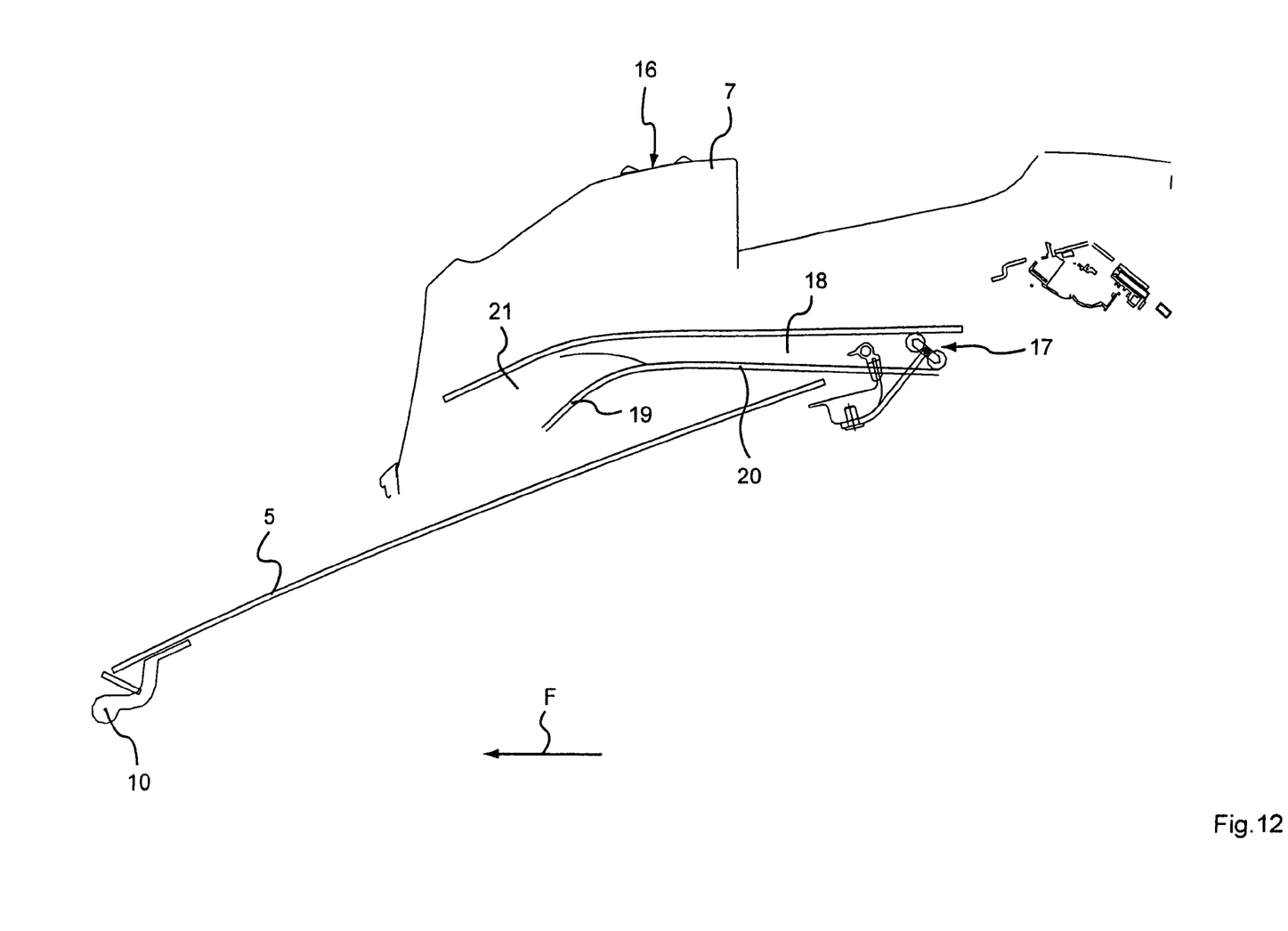
FIG. 12 is a similar view to FIG. 11 with the tailgate and rear window completely open, the rear window being partly overlapped by the tailgate in this position.
Figure 13:
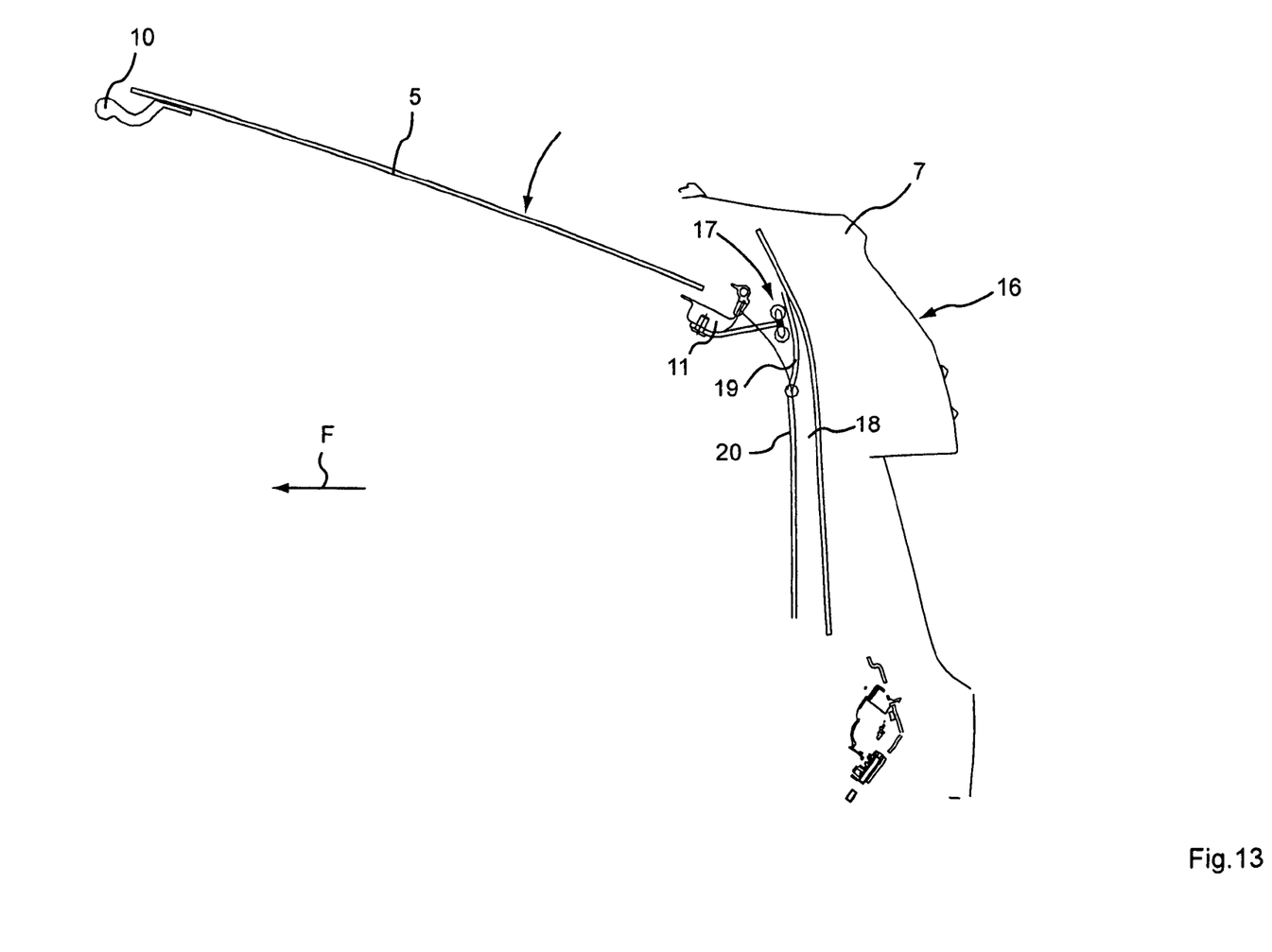
FIG. 13 is a similar view to FIG. 7 with the inner guide track folded outwardly to provide freedom of movement for opening of the convertible roof.
Figure 14:
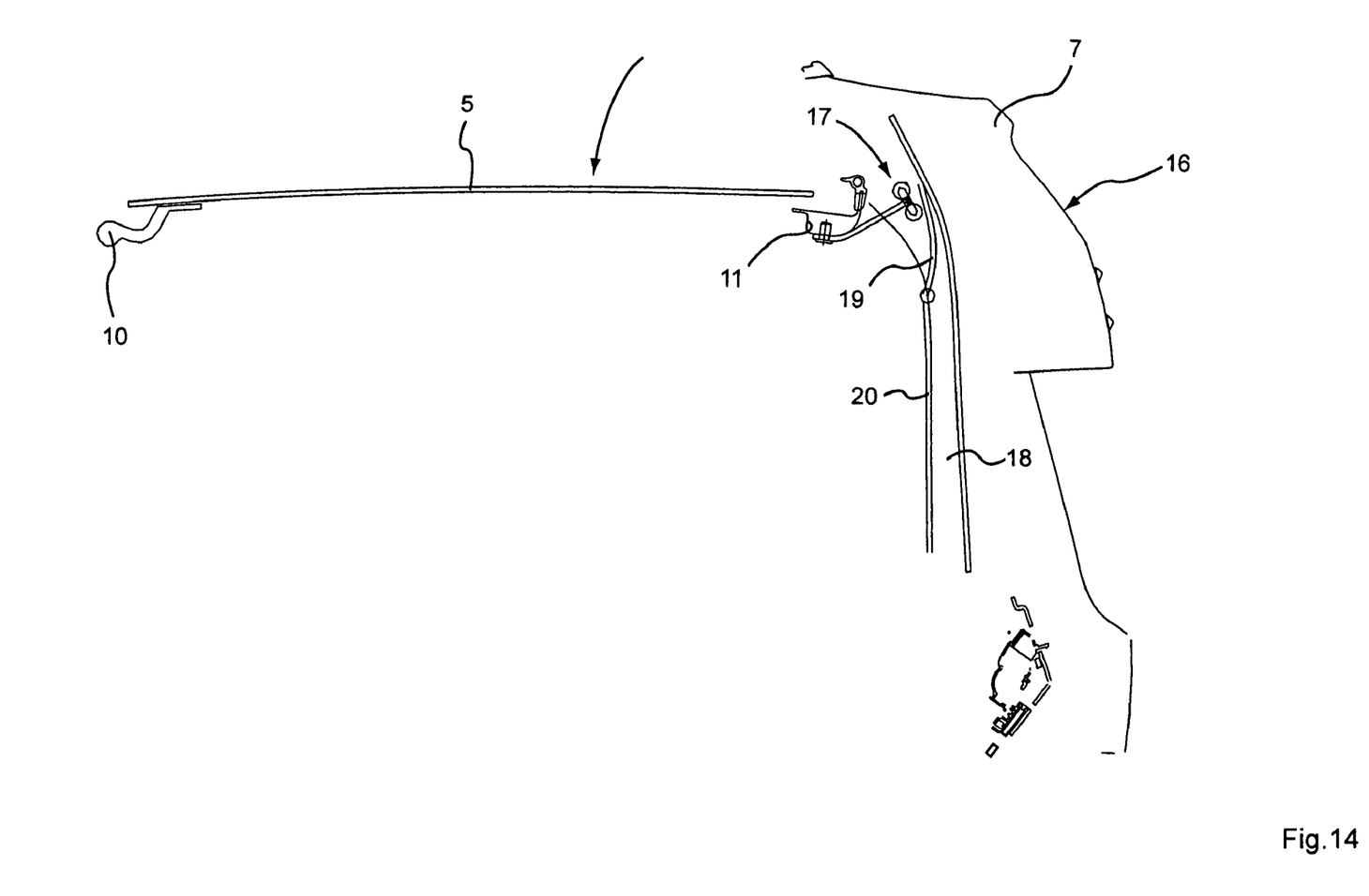
FIG. 14 is a view similar to FIG. 13 with the rear window stored.

The opening of the tailgate 7, along with rear window 5, is shown in FIGS. 7 to 12. FIGS. 13 and 14, in contrast, illustrate the opening of the convertible roof with the rear window 5 embedded in the side regions 6 of the roof. An upper part 19 of the inner (front) guide rail 20 can be pivoted like a switch for this procedure. When the tailgate 7 and the rear window 5 are both closed, as shown in FIG. 7, the twin roller 17 is located in an expanded funnel opening 21 of the guide track 18 and does not have any contact with the inner guide rail 20. This allows the upper part 19 of the inner guide rail 20 to pivot to the position show in FIGS. 13 and 14. If the upper part 19 remains in the inwardly guiding position shown in FIG. 7, the twin roller 17 runs automatically and in a compulsory manner into the guide track 18 when the tailgate 7 is opened. After the tailgate is displaced through a small opening angle, for example, up to 8° (FIG. 8), the twin roller is disposed in the guide track. A spring or other force on the rear window 5 is not necessary in this embodiment since the twin roller 17 is captured in the track 18 and is bound to it in a compulsory manner when the tailgate 7 is opened further. This compulsory movement is illustrated in FIG. 8 to 12. The relative position of the rear window 5 to the tailgate 8 can almost correspond to that of the first embodiment during this procedure.

When the roof 2 is opened like a convertible, in contrast, the rear window is pivotable forwardly in its embedded position in the roof 2 into an approximately horizontal position (FIG. 14). This is possible the upper section 19 of the inner guide rail 20 is switched to the rearward location. This switching was not necessary in the first embodiment due to the possibility of moving the roller 13 inwardly from the guide track 14.

Other coupling approaches between the tailgate 7 and the rear window 5 are also possible.

The invention furthermore also allows moving the tailgate 7 into a first open position opened less widely to provide the passage opening for the roof 2 and into a second open position moved further open to provide the loading opening, even though the tailgate moves in the same direction both times. A high headroom can thus be achieved during loading. The risk of an impact on a garage ceiling is, however, considerably reduced when the roof is opened.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A convertible vehicle comprising:
    a vehicle body having a passenger compartment, a convertible roof receiving space and a baggage space defined therein;
    a convertible roof with a rear part having a rear window, the convertible roof having a closed position wherein the convertible roof extends over the passenger compartment and an open position wherein the convertible roof is at least partially received in the roof receiving space;
    a tailgate at least partially covering the baggage space, the tailgate having an open position and a closed position, the tailgate being movable to the open position to define a loading opening for baggage;
    the rear window being automatically pivoted upwardly to provide an additional loading opening for baggage when the roof is in the closed position and the tailgate is moved to the open position to provide the loading opening for baggage.

2. A convertible vehicle according to claim 1, wherein the tailgate at least partially covers both the receiving space and the baggage space, the tailgate being moved in the same direction to the open position both to provide a passage opening for the convertible roof and to provide the loading opening for baggage.

3. A convertible vehicle according to claim 2, wherein the rear window remains in the rear part of the roof when the tailgate is moved to the open position to define the passage opening for the convertible roof.

4. A convertible vehicle according to claim 1, wherein the rear window is pivoted to the rear roof part and is biased to an open position, movement of the window to the open position being blocked by a portion of the tailgate when the tailgate is at least partially opened.

5. A convertible vehicle according to claim 4, further comprising:

spring elements operable to bias the rear window to the open position; and at least one roller body or slide body disposed on a lower edge of the rear window, the at least one roller body or slide body engaging a guide on the inner side of the tailgate.

6. A convertible vehicle according to claim 1, wherein the rear window is pivotable between a closed position and an open position, pivotable movement of the rear window being caused by movement of the tailgate.

7. A convertible vehicle according to claim 1 wherein when the tailgate is moved to the open position to define the loading opening for baggage and the rear window is automatically pivoted, the rear window is at least partially covered by the tailgate.

8. A convertible vehicle according to claim 1, wherein the tailgate is pivoted about an axis disposed below a window belt line of the vehicle.

9. A convertible vehicle according to claim 1, wherein the convertible vehicle is a hatchback vehicle and the tailgate includes a substantially upright trunk trim panel defining the rearmost end of the receiving space.

10. A convertible vehicle according to claim 9, wherein the tailgate further includes side wings that extend forwardly from the trunk trim panel such that the tailgate is generally U-shaped in a plan view.

11. A convertible vehicle according to claim 1, further comprising a pivot frame, the rear window being pivotable to an open position with respect to the pivot frame when the tailgate is in the closed position.

12. A convertible vehicle according to claim 1, wherein the tailgate is pivotable to a first open position to define a passage opening for the convertible roof and to a second open position to define the loading opening for baggage, the tailgate being opened further in the second open position than in the first open position.

* * * * *

UNITED STATES PATENT AND TRADEMARK OFFICE
CERTIFICATE OF CORRECTION

PATENT NO.         : 7,758,093 B2
APPLICATION NO.    : 11/962345
DATED              : July 20, 2010
INVENTOR(S)        : Thomas Tobergte et al.

It is certified that error appears in the above-identified patent and that said Letters Patent is hereby corrected as shown below:

Column 2, line 52: After "vehicle" insert --can--;
Column 2, line 65: After "design," insert --the--;
Column 3, line 63: After "provided for" delete "the";
Column 5, line 65: Replace "show" with --shown--; and
Column 6, line 15: After "possible" insert --after--.

Signed and Sealed this

Fifth Day of October, 2010

David J. Kappos
*Director of the United States Patent and Trademark Office*